(12) United States Patent
Arslan

(10) Patent No.: US 11,736,322 B1
(45) Date of Patent: Aug. 22, 2023

(54) SIGNAL LEVEL TRACKING AND APPLICATION TO VITERBI EQUALIZATION

(71) Applicant: Silicon Laboratories Inc., Austin, TX (US)

(72) Inventor: Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/872,325

(22) Filed: Jul. 25, 2022

(51) Int. Cl.
*H04L 25/03* (2006.01)
*H04L 25/45* (2006.01)

(52) U.S. Cl.
CPC .. *H04L 25/03878* (2013.01); *H04L 25/03019* (2013.01); *H04L 25/45* (2013.01)

(58) Field of Classification Search
CPC ... H04W 84/025; H04W 16/28; H04W 88/06; H04W 36/18; H04W 56/0035; H04W 88/02; H04B 7/0851; H04B 7/01; H04B 17/318; H04B 7/2681; H04B 1/7083; H04B 1/71057; H04B 1/7117; H04L 1/0071; H04L 1/0065; H04L 1/0041; H04L 1/006; H04L 1/007; H04L 1/0045; H04L 1/0057

USPC .......................................................... 375/232
See application file for complete search history.

(56) References Cited

U.S. PATENT DOCUMENTS

| | | | | |
|---|---|---|---|---|
| 5,841,816 A | * | 11/1998 | Dent | ................. H04L 25/03178 375/366 |
| 11,387,969 B2 | * | 7/2022 | Jia | ..................... H04W 72/0473 |
| 2005/0249273 A1 | * | 11/2005 | Ashley | ............... H03H 17/0294 375/232 |
| 2006/0242545 A1 | * | 10/2006 | Lin | .................. G11B 20/10101 714/795 |

* cited by examiner

*Primary Examiner* — Eva Y Puente
(74) *Attorney, Agent, or Firm* — Nields, Lemack & Frame, LLC

(57) ABSTRACT

A system that includes a Viterbi Equalizer having adaptive signal levels is disclosed. Each branch metric of the Viterbi Equalizer compares the value of the incoming bit to one of a plurality of different expected signal levels. A set of default signal values may be used by the Viterbi Equalizer. The system is also configured to determine whether these default expected signal levels are acceptable by monitoring the incoming data bits. If it is determined that the actual signal levels of the incoming data bits differ from the default expected signal levels by more than a predetermined amount, the signal levels used by the Viterbi Equalizer may be changed from default signal levels to the adaptive signal levels. The adaptive signal levels may be determined using the synchronization pattern.

20 Claims, 8 Drawing Sheets

SIGNAL LEVEL TRACKING AND APPLICATION TO VITERBI EQUALIZATION

FIELD

This disclosure describes systems and methods for implementing a Viterbi Equalizer that has adaptive signal levels.

BACKGROUND

Data communications require the formatting, encoding and modulation of data from a sending device to a receiving device. In many communication systems, the communication channel, which may be a cable, wire or another medium, such as air, introduces errors, due to noise, bandwidth limitations or other factors.

Thus, in some embodiments, special techniques are used at the receiving device to reconstruct the received data. The Viterbi algorithm has become an essential in communication receivers, performing demodulation, decoding, equalization and other functions. A Viterbi equalizer may be used to determine the values of a stream of incoming bits.

A Viterbi equalizer relies on calculating branch metrics for each possible branch. Often, these branch metrics are defined as the difference between the actual value of an incoming data bit and one of a plurality of expected signal levels. The actual value of the incoming data bit may be affected by inter-symbol interference (ISI). For example, if a data stream has a pattern of alternating ones and zeros, it is likely the value of an incoming data bit is influenced by the bits adjacent to that bit, which both have a different value. Conversely, if a data stream has a plurality of bits having the same value, the value of an incoming data bit will be less impacted by the adjacent bits, since they are the same value. Further, the parameters used by the transmit and receive circuits may affect the expected signal levels of the incoming data.

As noted above, a Viterbi equalizer uses branch metrics that compute the difference between the actual value of an incoming data bit and one or a plurality of various expected signal levels to determine whether that incoming bit is a zero or a one. If the expected signal levels that are used by the Viterbi equalizer are inaccurate, the results from the Viterbi Equalizer may be compromised.

Therefore, it would be beneficial if there were a system and method that utilizes a Viterbi Equalizer that allowed adaptive signal levels. Further, it would be advantageous if there were a system and method to determine these expected signal levels based on the received data.

SUMMARY

A system that includes a Viterbi Equalizer having adaptive signal levels is disclosed. Each branch metric of the Viterbi Equalizer compares the value of the incoming bit to one of a plurality of different expected signal levels. A set of default signal values may be used by the Viterbi Equalizer. The system is also configured to determine whether these default expected signal levels are acceptable by monitoring the incoming data bits. If it is determined that the actual signal levels of the incoming data bits differ from the default expected signal levels by more than a predetermined amount, the signal levels used by the Viterbi Equalizer may be changed from default signal levels to the adaptive signal levels. The adaptive signal levels may be determined using the synchronization pattern.

According to one embodiment, a wireless network device is disclosed. The wireless network device comprises a processing unit; and a receive circuit, wherein the receive circuit comprises: an RF circuit to generate incoming data; a frequency offset circuit to remove a frequency offset from the incoming data to create received data samples; a synchronization pattern detector to detect a synchronization pattern from a plurality of received data samples; and a Viterbi equalizer, wherein branch metrics between states of the Viterbi equalizer are calculated based on a difference between each received data sample and an expected signal level; wherein at least a portion of the synchronization pattern is used to determine adaptive signal levels; and wherein the processing unit determines whether the adaptive signal levels or default signal levels are used to compute the branch metrics in the Viterbi equalizer. In some embodiments, the adaptive signal levels are always used. In some embodiments, the adaptive signal levels are used when absolute values of the adaptive signal levels are less than absolute values of the default signal levels. In some embodiments, the default signal levels are used by the synchronization pattern detector. In some embodiments, the received data sample is a differentiated phase value, and wherein the branch metrics between states are calculated based on a difference between the differentiated phase value and the expected signal level, wherein the expected signal level is determined based on the differentiated phase value of an incoming data bit and differentiated phase values of incoming data bits immediately adjacent to the incoming data bit. In certain embodiments, six expected values are used in calculating the branch metrics. In some embodiments, a first expected value is used when the incoming data bit is a one and the incoming data bits immediately adjacent to the incoming data bit are also one; and a second expected value, having an equal amplitude and opposite polarity of the first expected value is used when the incoming data bit is a zero and the incoming data bits immediately adjacent to the incoming data bit are also zero. In certain embodiments, a first adaptive signal level and a second adaptive signal level are calculated using bits within the synchronization pattern having a value of one wherein adjacent bits are also one, and using bits within the synchronization pattern having a value of zero wherein the adjacent bits are also zero. In some embodiments, a third expected value is used when the incoming data bit is a one and the incoming data bits immediately adjacent to the incoming data bit are zero; and a fourth expected value, having an equal amplitude and opposite polarity of the third expected value is used when the incoming data bit is a zero and the incoming data bits immediately adjacent to the incoming data bit are one. In certain embodiments, a third adaptive signal level and a fourth adaptive signal level are calculated using bits within the synchronization pattern having a value of one wherein adjacent bits are both zero, and using bits within the synchronization pattern having a value of zero wherein the adjacent bits are both one. In some embodiments, a fifth expected value is used when the incoming data bit is a one and exactly one of the incoming data bits immediately adjacent to the incoming data bit is one; and a sixth expected value, having an equal amplitude and opposite polarity of the fifth expected value is used when the incoming data bit is a zero and exactly one of the incoming data bits immediately adjacent to the incoming data bit is zero. In certain embodiments, a fifth adaptive signal level and a sixth adaptive signal level are calculated using bits within the synchronization pattern having a value of one wherein exactly one adjacent bit is also one, and using bits within the synchronization pattern having a value of zero wherein exactly one adjacent bit is also zero. In some embodiments, the receive circuit comprises a preamble detector to detect a preamble pattern wherein at least a portion of the preamble pattern is also used to determine the adaptive signal levels.

According to another embodiment, a wireless network device for receiving a packet is disclosed. The wireless network device comprises a processing unit; and a receive circuit, wherein the receive circuit comprises a Viterbi equalizer, wherein branch metrics between states of the Viterbi equalizer are calculated based on a difference between a received data sample and an expected signal level; wherein at least a portion of the packet is used to determine adaptive signal levels; and wherein the processing unit determines whether the adaptive signal levels or default signal levels are used to compute the branch metrics in the Viterbi equalizer. In some embodiments, the at least a portion of the packet comprises a synchronization pattern of the packet. In some embodiments, the adaptive signal levels are computed using a pseudo inverse matrix multiplied by the received data samples associated with the at least a portion of the packet. In certain embodiments, the at least a portion of the packet comprises a synchronization pattern of the packet, and wherein a matrix from which the pseudo inverse matrix is calculated is constructed based on a known sequence of data values in the synchronization pattern. In some embodiments, frequency offset is computed using a pseudo inverse matrix multiplied by the received data samples associated with the at least a portion of the packet. In certain embodiments, the frequency offset is subtracted from incoming data samples so as to create the received data samples entering the Viterbi equalizer. In some embodiments, the at least a portion of the packet comprises data samples from a payload of the packet.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As described above, the values of incoming data bits may be affected by the parameters used by the transmit circuit and the received circuit.

Figure 1A:
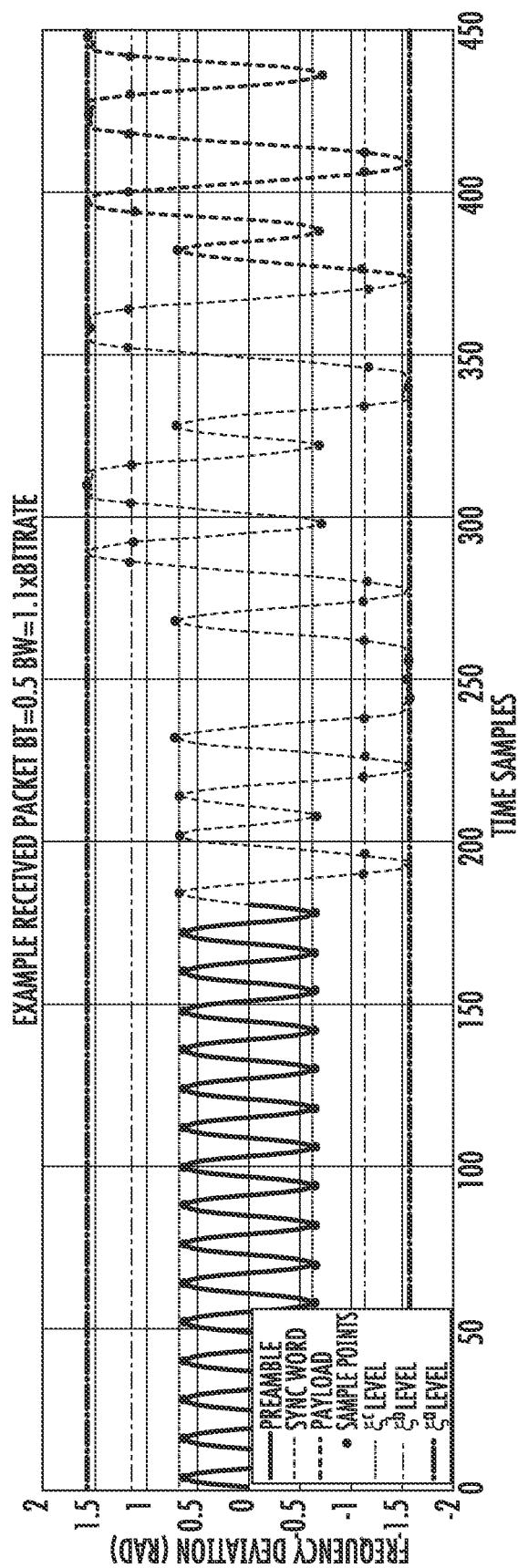
FIGS. 1A-1B shows an incoming data stream using two different sets of parameters for the receive circuit.

FIG. 1A shows a timing diagram of incoming data bits using the channel settings that are defined by the BlueTooth standard. In this scenario, the bandwidth is set to 1.1 times the bit rate and the BT (bandwidth multiplied by symbol time) is set to 0.5. Note that the beginning of this sequence is the preamble, defined by alternating ones and zeros. The preamble is followed by the synchronization pattern, and then the payload. Because adjacent bits in the preamble have opposite values, the peak values of these bits are lower than some of the bits that appear later in the sequence. This is due to inter-symbol interference (ISI). In fact, an alternating pattern of ones and zeros results in the lowest expected signal level, which is defined in this disclosure as $\xi_c$. At time 250, which is during the synchronization pattern, it can be seen that there are a plurality of adjacent bits having the same value. The magnitude of the value of these bits is much greater than those in the preamble because each adjacent bit also has the same value. Thus, a pattern of 3 or more bits having the same value will result in the highest expected signal level, which is defined in this disclosure as $\xi_a$. There is another expected signal level which is defined by the situation where the bits adjacent on either side of a particular bit are different values. Sequences such as 001, 011, 110, or 100, fall into this category. This expected signal level is defined in this disclosure as $\xi_b$. These three signal levels can be seen in FIG. 1A. Note that because Bluetooth explicitly defines the transmit circuit parameters, such as shaping, and read circuit parameters, such as channel bandwidth (BW) and BT, the values of $\xi_a$, $\xi_b$, and $\xi_c$ can be predetermined.

Figure 1B:
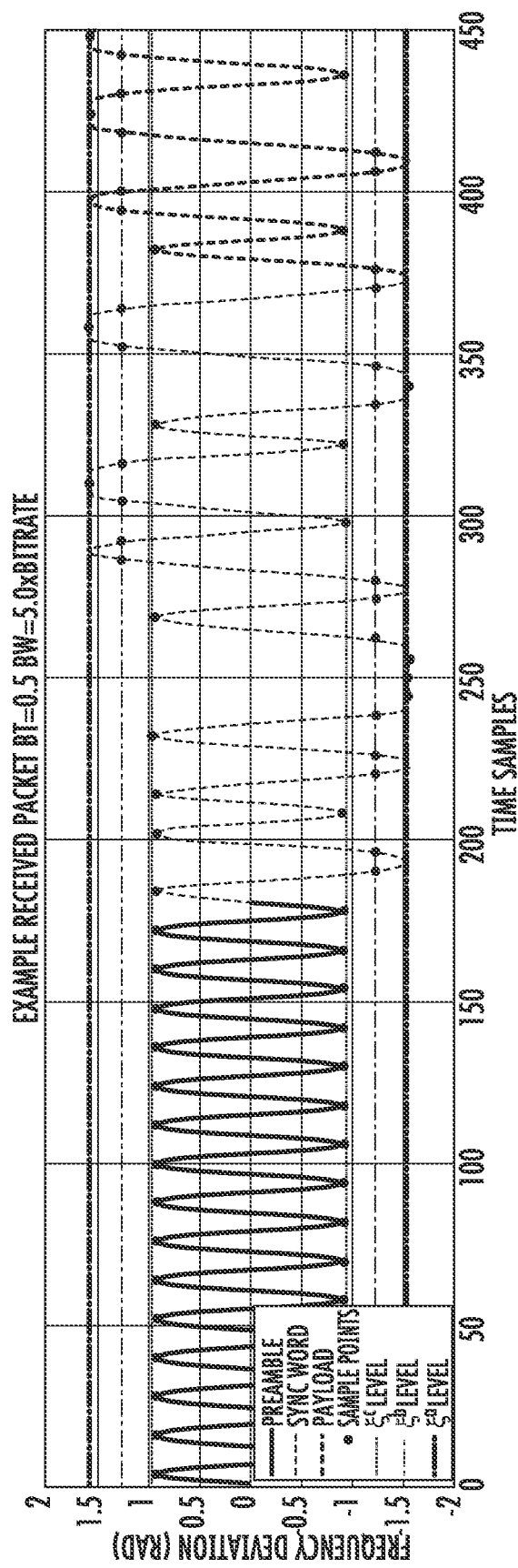

However, other network protocols do not specify these parameters, or provide wide ranges of acceptable values for these parameters. For example, FIG. 1B shows the same data stream as was shown in FIG. 1A, but the channel bandwidth is changed to 5.0 times the bit rate. Note that the amplitude of the data bits that comprise the preamble are greater than those shown in FIG. 1A. Similarly, the plurality of adjacent bits at time 250 that have the same value also have a greater amplitude than the corresponding bits in FIG. 1A. The expected signal levels, $\xi_a$, $\xi_b$, and $\xi_c$, are also shown in this figure and are clearly different than those shown in FIG. 1A. Thus, by changing the bandwidth of the receive circuit, the expected signal levels of the incoming data bits are changed. Similar changes in signal levels also occur when the BT of the receive channel is changed.

Thus, it may be beneficial if the network device was able to determine the expected signal levels and then utilize these determined signal levels in the Viterbi Equalizer.

Figure 2:
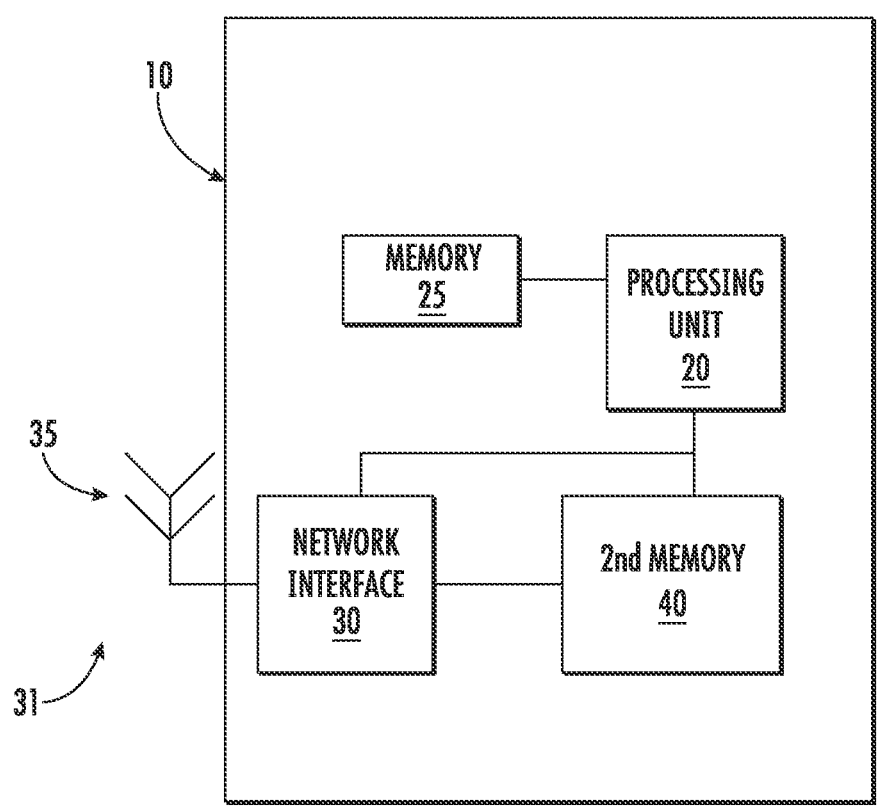
FIG. 2 is a block diagram of a representative network device that may determine expected signal levels and utilize those signal levels in a Viterbi Equalizer according to one embodiment.

FIG. 2 shows a block diagram of a representative network device 10 that utilizes the Viterbi Equalizer that utilizes adaptive signal levels according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the wireless network 31. Although not shown, the network device 10 also has a power supply, which may be a battery or a connection to a permanent power source, such as a wall outlet.

While the processing unit 20, the memory device 25, the network interface 30, and the second memory device 40 are shown in FIG. 2 as separate components, it is understood that some or all of these components may be integrated into a single electronic component. Rather, FIG. 2 is used to illustrate the functionality of the network device 10, not its physical configuration.

Figure 3A:
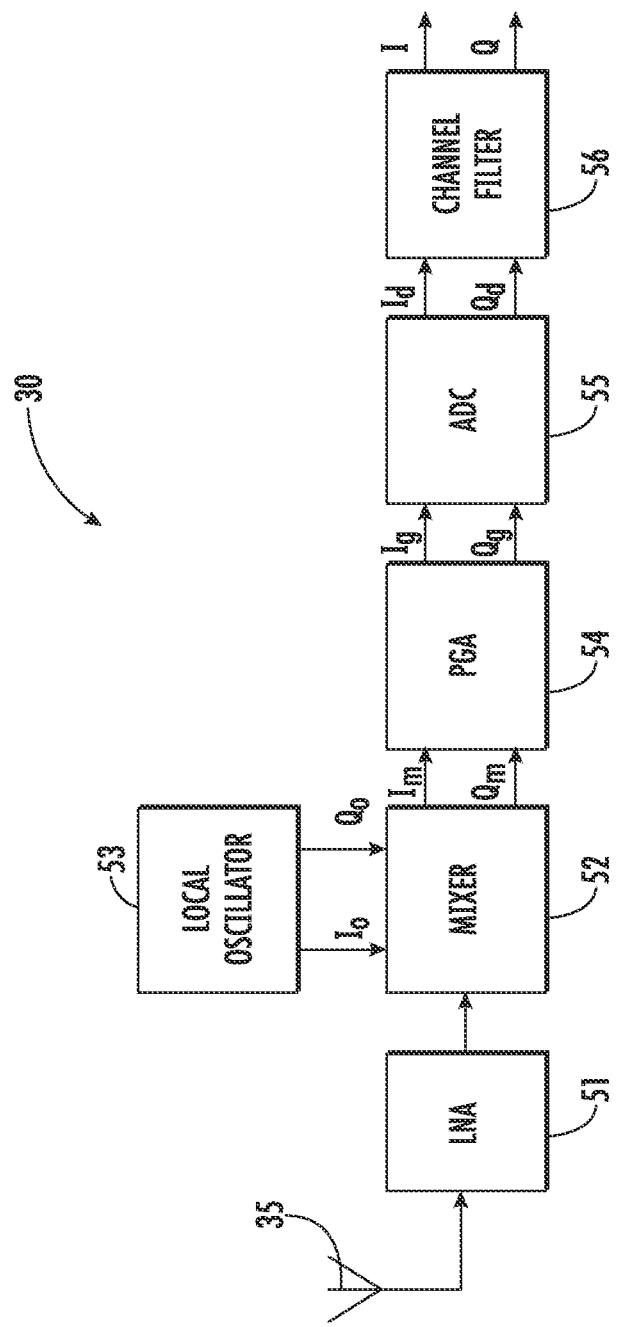
FIG. 3A is a detailed block diagram of a first part of the network interface of the network device of FIG. 2.
Figure 3B:
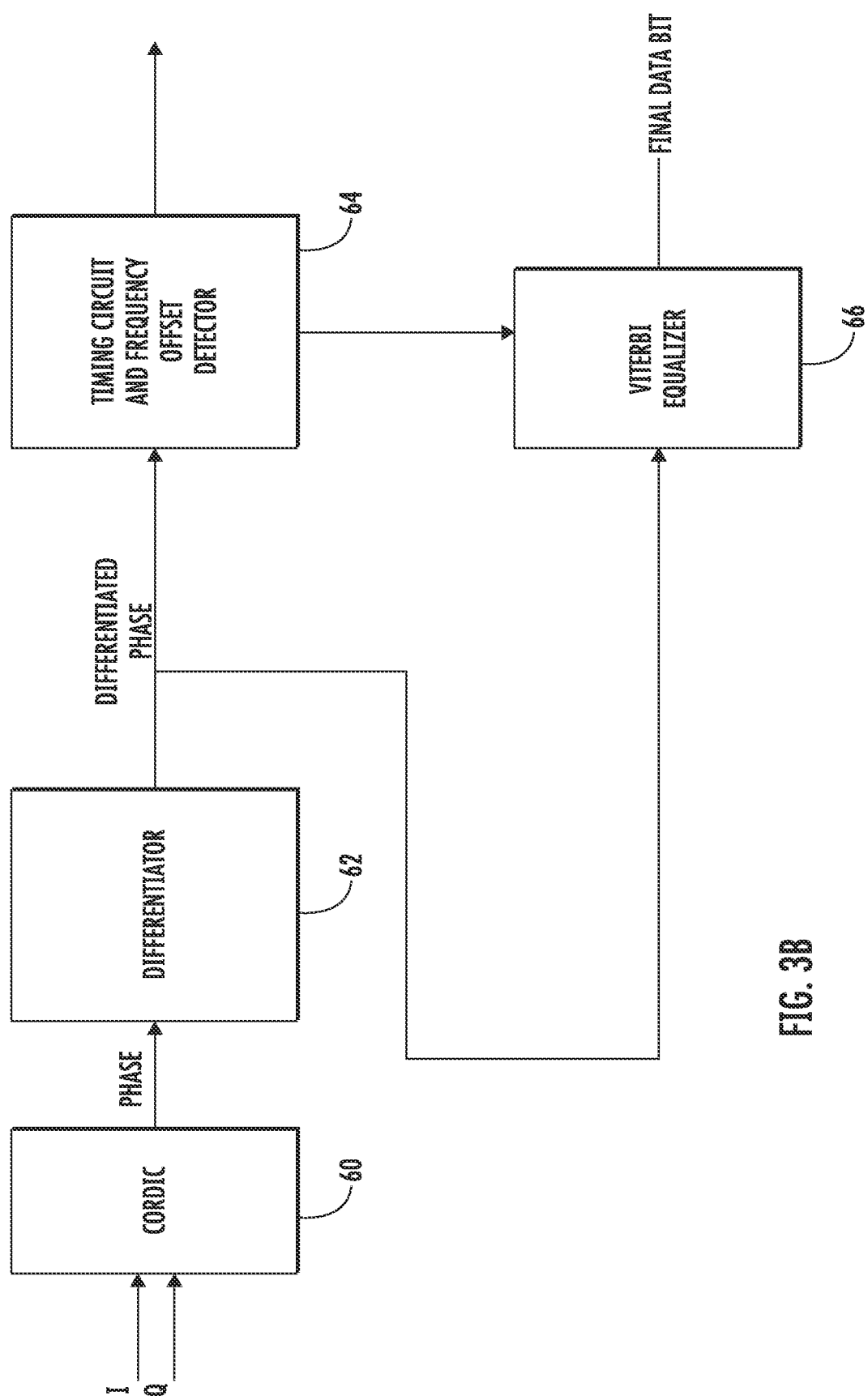
FIG. 3B is a detailed block diagram of a second part of the network interface of the network device of FIG. 2.

FIG. 3A-3B provide a more detailed illustration of the network interface 30. As shown in FIG. 3A, the wireless signals first enter the network interface 30 through the antenna 35. The antenna 35 is in electrical communication with a low noise amplifier (LNA) 51. The LNA 51 receives a very weak signal from the antenna 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52, are then fed into programmable gain amplifier (PGA) 54. The PGA 54 amplifies the $I_m$ and $Q_m$ signals by a programmable amount. These amplified signals may be referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may then pass through a channel filter 56. The filtered signals are referred to as I and Q. The output of the channel filter 56 may be referred to as the baseband signals. The components that are used to receive the signal from the antenna 35 and produce the baseband signals are referred to as the RF circuit.

These I and Q signals can be used to recreate the amplitude and phase of the original signal. In certain embodiments, the I and Q values may be considered complex numbers, wherein the I value is the real component and the Q value is the imaginary component.

As shown in FIG. 3B, the I and Q signals then enter a CORDIC (Coordination Rotation Digital Computer) 60, which determines the amplitude and phase of the signals. Amplitude is given as the square root of $I^2$ and $Q^2$, while phase is given by the $\tan^{-1}$ (Q/I). In some embodiments, the CORDIC 60 may be a hardware component disposed in the network interface 30. In other embodiments, the CORDIC may be implemented in software.

The phase output from the CORDIC 60 is then supplied as an input to the differentiator 62. As is well known, the derivative of phase is frequency. Thus, by subtracting the values of two adjacent phase values, and optionally dividing the difference by a time duration, a value that is indicative of frequency can be determined. In some embodiments, the differentiator 62 may be a hardware component disposed in the network interface 30. In other embodiments, the differentiator may be implemented in software. The differentiated phase signal may be a signed value, such as an 8-, 16- or 32-bit signed value.

The differentiated phase signal is used as an input to a Timing Circuit and Frequency Offset Detector 64. The Timing Circuit and Frequency Offset Detector 64 is used to detect when the synchronization pattern has been detected. This circuit is also used to determine any frequency offset between the clock used by the transmitter and the clock used by this network device 10.

The differentiated phase signal is also used as an input to a Viterbi Equalizer 66. The Viterbi Equalizer 66 is used to determine the value of each data bit, based on the values of the adjacent data bits, as described in more detail below. The output from the Viterbi Equalizer 66 is the value of the data bit (i.e., 0 or 1). In some embodiments, the Viterbi Equalizer 66 may be a hardware component disposed in the network interface 30. In other embodiments, the Viterbi Equalizer may be implemented in software. The input to the Viterbi Equalizer 66 is a differentiated phase signal; however, in other embodiments, it may be the phase signal. Further, the input is a multi-bit digital value, which is referred to as a data sample.

Having described many of the components in the network interface 30, the Viterbi Equalizer 66 will be described in more detail.

Figure 4:
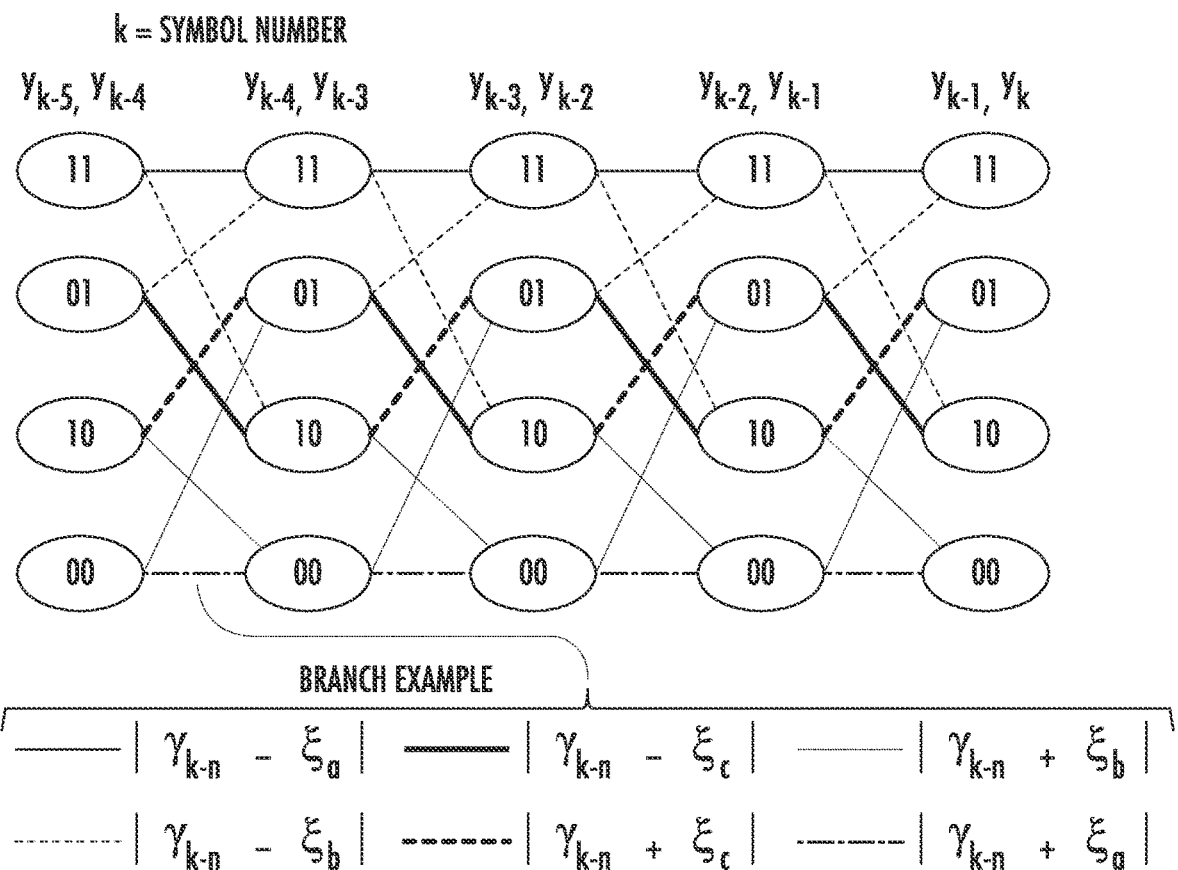
FIG. 4 shows a representative Viterbi trellis with multiple states and multiple stages.

As is known, a Viterbi Algorithm may be modelled as a trellis, having a plurality of states and stages. In certain embodiments, the stages may be related to time, similar to a shift register. The Viterbi algorithm tracks the path metrics through stages, saving only those paths that have the possibility of being the best path, which may be defined as the path with the lowest total cost. For example, FIG. 4 shows an example Viterbi. In this figure, the stages are each represented as a column that includes 4 states. The values between states represent the cost of that branch, where lower values are more desirable. To calculate the cost of every possible path from each state in the first stage to every state in the last stage is possible, but may be compute and memory intensive. The Viterbi algorithm reduces the number of calculations by only retaining the lowest cost path metrics along the trellis.

In one embodiment, for the Viterbi Equalizer, the states are used to represent the last N received bits, so the number of states is defined as $2^N$. In one embodiment, the differentiated phase of a particular data bit is related to its value, as well as the values of the adjacent bits (i.e., the bit immediately preceding the particular bit and the bit immediately following the particular bit). In this embodiment, a four state Viterbi Equalizer may be used. If the differentiated phase of a particular bit is related to more than two other bits, the number of states would be increased accordingly.

As can be seen in FIG. 4, the data samples enter the trellis at the left and the path moves to the right as more data samples are received. Note that each state represents the binary value of the two most recently received data bits, where the older of the two bits is the leftmost bit. Thus, a value of 01 indicates that the most recent bit was a 1 and the bit before that was a 0. Of course, the states could be defined in the opposite manner, so that the most recent bit is on the left. Each stage represents a different point in time. Thus, as shown in FIG. 4, the states of the rightmost stage represent the two most recently received bits. While FIG. 4 shows five stages, it is understood that, using this technique, the Viterbi Equalizer may have any desired number of stages.

As new data samples are received, the binary state of the new bit becomes the rightmost bit of the state, while the previously received bit is shifted to the leftmost bit of the state. Thus, if the current state is 01 and a 0 is received, the new state will be 10. Conversely, if a 1 is received, the new state is 11. Therefore, there are exactly two paths exiting each state.

Having described how the states are labelled, the transitions between states will now be described. Each transition between states is assigned a branch metric, which is a measure of the likelihood that this transition is correct. For example, assume that when transitioning from state 11 to the adjacent state 11, it is assumed that the incoming data sample would have an expected value of $\xi_a$. If the incoming data sample has this value, then this transition has a path metric of 0, indicating that it is likely a correct transition. If the incoming data sample has a different value, then this transition has a non-zero value. Thus, the branch metric between any two stages can be defined as:

$|x-\xi_{\{a,b,c\}}|$ wherein x is the actual value of the data sample and one of $\xi_{\{a,b,c\}}$ is the expected value.

Thus, the expected differentiated phase of a data sample may be determined based on its value, and the values of the immediately surrounding bits. The following table shows the possible combinations.

| Previous Bit | Current Bit | Next Bit | Expected differentiated phase |
|---|---|---|---|
| 0 | 0 | 0 | $-\xi a$ |
| 0 | 0 | 1 | $-\xi b$ |
| 0 | 1 | 0 | $+\xi c$ |
| 0 | 1 | 1 | $+\xi b$ |
| 1 | 0 | 0 | $-\xi b$ |
| 1 | 0 | 1 | $-\xi c$ |
| 1 | 1 | 0 | $+\xi b$ |
| 1 | 1 | 1 | $+\xi a$ |

Using the information from the above table, the branch metrics for each transition in the trellis shown in FIG. 4 can be determined. These branch metrics are all illustrated in FIG. 4.

As noted above, each data sample that is received by the Viterbi Equalizer 66 is a multi-bit value, such as an 8-, 16- or 32-bit value.

As data samples are received, the Viterbi Equalizer 66 calculates each branch metric, by comparing the actual received differentiated phase value to the theoretical value, as described above. At each stage, some of the paths may be eliminated, such that only the least costly paths are retained.

Thus, the Viterbi Equalizer 66 relies on the expected signal levels $\xi_a$, $\xi_b$, and $\xi_c$ to determine the proper value for each incoming data sample. If the expected signal levels are not accurate or biased, the costs for each branch will be inaccurate, possibly resulting in an inaccuracy in determining the proper value of each bit.

Traditionally, the values of the expected signal levels $\xi_a$, $\xi_b$, and $\xi_c$ are predetermined. However, in the present disclosure, these expected values may be changed based on the actual received data samples.

It can be shown that the optimal values for the expected signal levels $\xi_a$, $\xi_b$, and $\xi_c$ can be determined by minimizing the cost function:

$$C = \sum_{i=0}^{N-1} |y_i - \xi_i|^2$$

where C is cost, $y_i$ is an incoming data sample and $\xi_i$ is the expected value of that data sample. Note that this cost function assumes that there is no frequency offset. This equation can be rewritten in matrix notation as:

$$C = (y - Ax)^T(y - Ax), \text{ where } y = \begin{bmatrix} y_0 \\ y_1 \\ y_2 \\ \vdots \\ y_{N-1} \end{bmatrix}$$

$$A = \begin{bmatrix} s_0^a & s_0^b & s_0^c \\ s_1^a & s_1^b & s_1^c \\ s_2^a & s_2^b & s_2^c \\ \vdots & \vdots & \vdots \\ s_{N-1}^a & s_{N-1}^b & s_{N-1}^c \end{bmatrix} \text{ and } x = \begin{bmatrix} \xi_a \\ \xi_b \\ \xi_c \end{bmatrix}$$

In the A matrix, the coefficients are set to −1, 0 or 1, depending on the state of the received bit. In other words, if bit N in the synchronization pattern is a 1 and is surrounded by two adjacent bits of 0, the coefficients in the $N^{th}$ row of the A matrix would be 0,0,1, since the expected value ism. If bit M in the synchronization pattern is a 0 which has exactly one adjacent data bit of 1, the coefficients in the $M^{th}$ row of the A matrix would be 0,−1,0, since the expected value is $-\xi_b$.

The gradient of this equation, with respect to the unknown vector x, may be used to solve for the unknown vector x. Specifically, the gradient is as follows:

$\nabla_x C = 2A^T A x - 2A^T y = 0$;

Solving for this results in:

$x = (A^T A)^{-1} A^T y = A^\dagger$, where $A^\backslash$ is the pseudo inverse of A and can be precalculated.

It can be seen that the values of the unknown vector x can be defined as follows:

$\xi_a$ is the average of $|y_i|$ for all i where $\xi_a$ or $-\xi_a$ is expected;

$\xi_b$ is the average of $|y_i|$ for all i where $\xi_b$ or $-\xi_b$ is expected; and $\xi_c$ is the average of $|y_i|$ for all i where $\xi_c$ or $-\xi_c$ is expected;

Stated differently, when there is an incoming data bit having a value 1 that is surrounded by 0 on both sides (i.e., 010), the expected value of that data sample is $\xi_c$. Similarly, when there is an incoming data bit having a value of 0 that is surrounded by 1 on both sides (i.e., 101), the expected value of that data sample is $-\xi_c$. Thus, in the data sequence, the absolute value of all data samples that are surrounded by bits of different value on both sides may be averaged to find the adaptive value of $\xi_c$.

Similarly, when there is an incoming data bit having a value 1 that is surrounded by 1 on both sides (i.e., 111), the expected value of that data sample is $\xi_a$. Similarly, when there is a 0 that is surrounded by 0 on both sides (i.e., 000), the expected value of that data sample is $-\xi_a$. Thus, in the data sequence, the absolute values of all data samples that are surrounded by bits of the same value on both sides may be averaged to find the adaptive value of $\xi_a$.

Finally, when there is an incoming data bit having a value 1 that is surrounded by 1 on only one side (i.e., 110 or 011), the expected value of that data sample is $\xi_b$. Similarly, when there is a 0 that is surrounded by 1 on only one side (i.e., 001 or 100), the expected value of that data samples is $-\xi_b$. Thus, in the data sequence, the absolute values of all data samples that are surrounded by bits that have a 1 on only one side may be averaged to find the adaptive value of $\xi_b$.

Thus, if there is a known sequence in the incoming data stream, the various bits in that sequence can be used to calculate the adaptive values for the signal levels.

Importantly, the preamble, which is typically an alternating pattern of 1s and 0s, is followed by a synchronization pattern, which has a predefined pattern. Thus, when the synchronization pattern is found, the bits in that pattern may be used to calculate the adaptive values for the signal levels.

The Timing Circuit and Frequency Offset Detector 64 may have two functions. First, it determines the frequency offset (if any) between the incoming data stream and the sample clock used by the network device 10. Second, it detects the synchronization pattern so that the incoming data stream can be corrected aligned to byte boundaries.

One approach to calculating frequency offset is to average the values of the data samples for all of the bits in the preamble. As noted above, the preamble is a sequence of alternating 1s and 0s. A bit having a value of 1 is typically transmitted at a first frequency, such as $F_c + F_d$, where $F_c$ is the carrier frequency and $F_d$ is the modulation frequency. A bit having the value of 0 is typically transmitted at a second frequency, such as $F_c - F_d$. Further, the carrier frequency is typically removed before the data bits are processed. Therefore, the preamble should appear as a sequence of data samples having alternating values of $F_d$ and $-F_d$, the sum of which should ideally be 0. However, if there is a frequency offset between the transmitting device and this network device, each of these values will be changed. In other words, the sequence of data bits will have alternating values of $F_o + F_d$ and $F_o - F_d$. Averaging all of the bits in the preamble will result in a value of $F_o$, which can then be subtracted from all of the incoming data bits to remove the frequency offset.

This frequency offset can then be removed from the data samples before further processing. In one embodiment, a subtraction circuit is provided after the differentiator 62, which subtracts the frequency offset before the data samples are used by the Viterbi Equalizer 66. In another embodiment, a digital mixer may be disposed before the channel filter to remove the IF frequency. The frequency offset can be removed using this digital mixer. Other techniques may be used to remove the frequency offset and the disclosure is not limited to any particular technique.

The other function of the Timing Circuit and Frequency Offset Detector 64 is to identify the synchronization pattern. This can be done by creating a cost function where a sequence of data samples is compared to the known synchronization pattern. The point at which this cost function is minimized is identified as the synchronization pattern. The rest of the receive circuit can then use this indication to properly align the incoming bits into bytes.

Figure 5:
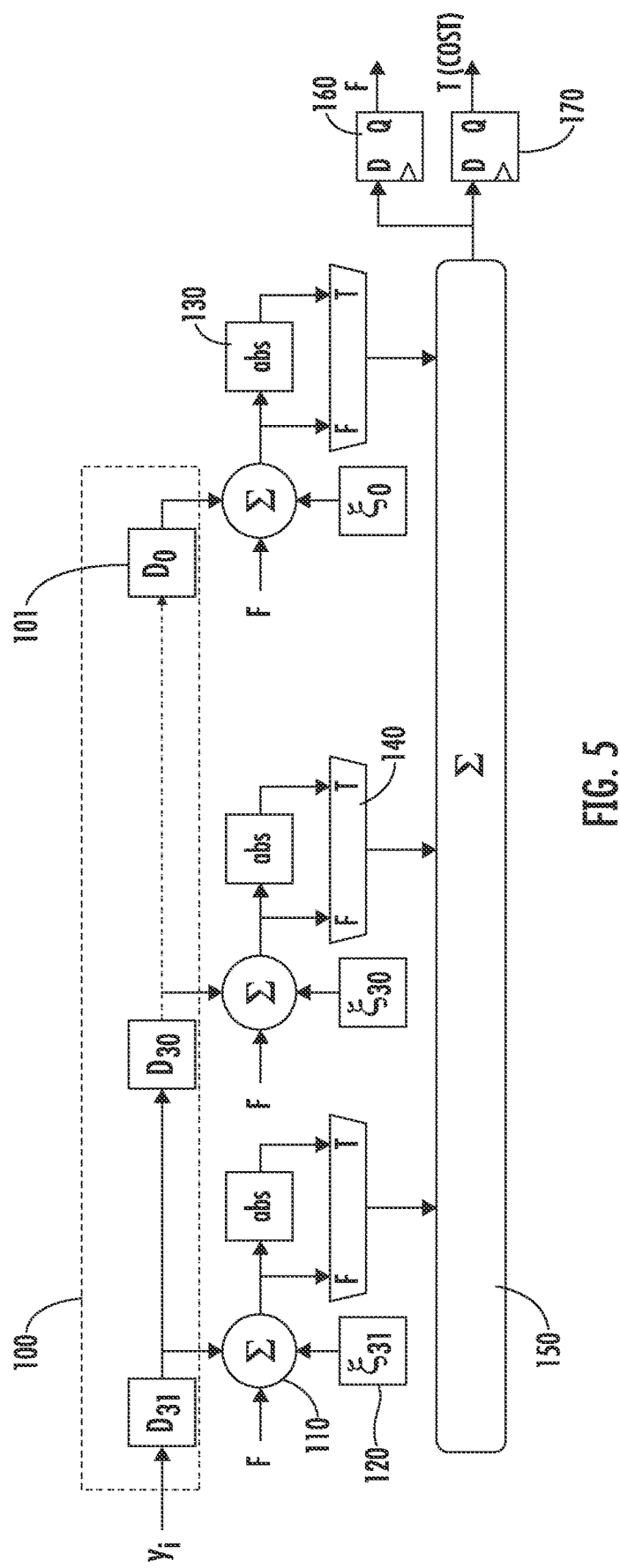
FIG. 5 shows the Timing Recovery and Synchronization circuit according to one embodiment.

FIG. 5 shows the Timing Circuit and Frequency Offset Detector 64 according to one embodiment. In this embodiment, the incoming data samples enter a shift register 100, which is made up of a plurality of storage devices 101, such as flip-flops or memory locations. As each new data sample enters the shift register 100, the data sample in each storage device 101 is moved to the adjacent storage device, such that the shift register 100 contains the most recently received N data samples, where N is the length of the shift register. In some embodiments, the preamble and the synchronization pattern may each be 32 bits. In these embodiments, N is 32.

The output of each storage device 101 is also used as an input to an adder 110. The other inputs to each adder 110 are the frequency offset, which will be described later, and the expected signal level 120 for that particular bit, which depends on the pattern being detected. The expected signal level 120 is stored in a storage element, such as a set of flip-flops or a memory location.

The output of each adder 110 is used as a first input to a corresponding multiplexer 140 and an absolute value circuit 130. The absolute value circuit 130 is used to convert any negative values into positive values. The output of the absolute value circuit 130 is used as a second input to the corresponding multiplexer 140.

The output of each of the multiplexers 140 are then provided to a summing circuit 150. The output of the summing circuit 150 is then used to hold the frequency offset using frequency offset storage element 160, and is also used to hold the cost value using cost storage element 170.

Having defined the circuitry in the Timing Circuit and Frequency Offset Detector 64, its operation will now be described.

At first, the expected signal level 120 for each data sample is set to an alternating pattern of $\xi_c$ and $-\xi_c$. This is because the preamble is expected to have alternating 1s and 0s. Further, the value of F, which is an input to the adders 110 is initially set to 0.

When the entire preamble is present in the shift register 100, the output of the adders 110 should be at their minimum, since the values of the data samples should roughly equal the expected signal levels 120. However, as described above, a frequency offset may be present, which keeps the outputs of the adders 110 from being 0. The output of each of the adders 110 at this time may be given by: $y_i \pm \xi_c$, wherein the sign of $\xi_c$ is determined based on the bit position. All even numbered bit positions ($y_0, y_2, \ldots y_{30}$) have the same value and all odd numbered bit positions ($y_1, y_3, \ldots y_{31}$) have the opposite value. The outputs from the adders 110 are passed through the multiplexers 140 and appear at the summing circuit 150, which then totals all of these values. The output of the summing circuit 150 is then saved in frequency offset storage element 160. In certain embodiments, the least significant 5 bits of the output are ignored, which converts the sum into an average, and the remaining bits are stored as the frequency offset, F. Thus, at this point, the Timing Circuit and Frequency Offset Detector 64 produces F, which is defined as:

$$\frac{1}{32}\sum_{i=0}^{31}(y_i - \xi_i),$$

wherein $\xi i$ is either $\xi_c$ or $-\xi_c$.

Having determined the frequency offset, the Timing Circuit and Frequency Offset Detector 64 is then reconfigured to find the synchronization pattern. First, F, which is an input to all of the adders 110 is now defined as the F value that was calculated above. The multiplexers 140 are also reconfigured so that the absolute value circuit 130 is used. Finally, the expected signal levels 120 are set in accordance with the expected value of the synchronization pattern. Looking at FIGS. 1A-1B, the synchronization pattern is defined as:
1,0,0,1,0,1,0,0,1,0,0,0,0,0,1,0,0,1,1,0,1,1,1,0,1,0,0,0,1,1, 1,0.

Using the table presented above, the expected value of each bit is as follows:

$\xi_c, -\xi_b, -\xi_b, \xi_c, -\xi_c, \xi_c, -\xi_b, -\xi_b, \xi_c, -\xi_b, -\xi_a, -\xi_a, -\xi_a,$
$-\xi_b, \xi_c, -\xi_b, -\xi_b, \xi_b, \xi_b, -\xi_c, \xi_b, \xi_a, \xi_b, -\xi_c, \xi_c, -\xi_b,$
$-\xi_a, -\xi_b, \xi_b, \xi_a, \xi_b, -\xi_b$

These values are then loaded into the respective storage elements that hold the expected signal levels 120. By configuring the Timing Circuit and Frequency Offset Detector 64 in this manner, the output from the summing circuit 150 is defined as:

$$C = \sum_{i=0}^{31}|y_i - F - \xi_i|$$

When this value is at a minimum, the synchronization pattern is detected. Further, because the data samples in the shift register 100 are known, the actual values of these data samples may be used to calculate the adaptive signal levels. Based on the pattern shown above, the absolute values of the data samples in one or more of positions 0, 3, 4, 5, 8, 14, 19, 23, and 24 can be averaged to determine the adaptive signal level $\xi_c$. The absolute values of the data samples in one or more of positions 1, 2, 6, 7, 9, 13, 15, 16, 17, 18, 20, 22, 25, 27, 28, 30, and 31 can be averaged to determine the adaptive signal level $\xi_b$. The absolute values of the data samples in one or more of positions 10, 11, 12, 21, 26, and 29 can be averaged to determine the adaptive signal level $\xi_a$.

While FIG. 5 shows the frequency offset function and the synchronization pattern detection being performed by a single circuit, it is understood that these functions can be separated into different circuits, each with its own shift register. For example, the frequency offset calculator may include a shift register, a set of adders and a summing circuit. The synchronization pattern detector may include a shift register a set of adders, a set of absolute value circuits and a summing circuit. However, in each of these embodiments, the synchronization pattern detector is used to determine which data bits are to be used to determine each of the adaptive signal levels.

Figure 6:
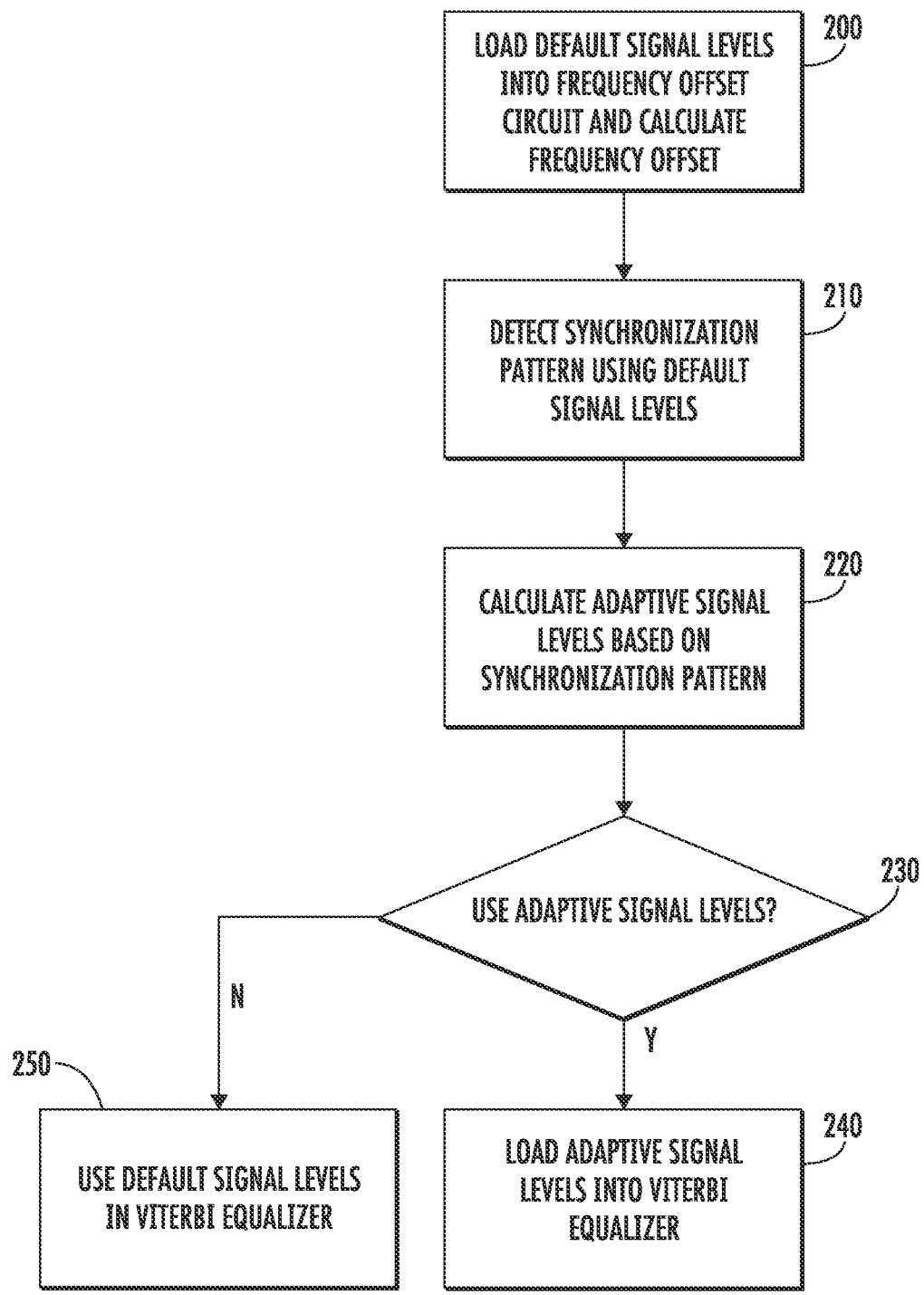
FIG. 6 shows a sequence executed by the network device to configure the Viterbi Equalizer.

Having described how the adaptive signal levels are determined, their use will now be discussed with reference to FIG. 6.

First, as shown in Box 200, the frequency offset circuit is pre-loaded with the default signal levels for $\xi_a$, $\xi_a$, and $\xi_c$.

The frequency offset of the incoming data stream may then be calculated. In one embodiment, this is performed by determining the DC value of the preamble pattern, as described above. In other embodiments, the frequency offset may not be calculated.

Then, as shown in Box 210, the synchronization pattern is detected by the synchronization pattern detector, as explained above. Again, the synchronization pattern detector uses the default signal levels for $\xi_a$, $\xi_a$, and $\xi_c$.

As shown in Box 220, the appropriate data samples in the synchronization pattern are used to determine the adaptive signal levels for $\xi_a$, $\xi_a$, and $\xi_c$. It is noted that this disclosure describes three different states that are determined based on the state of the current bit, the previous bit and the next bit. However, this system and method is also applicable to systems which use more than or fewer than 3 different signal levels. For example, each signal level may be based on the current bit, the two previous bits and the two next bits.

Once the adaptive signal levels are determined, the processing unit 20 determines whether these new values should be used instead of the default signal values, as shown in Box 230.

In certain embodiments, the adaptive signal levels that are calculated based on the synchronization pattern are always used. In other embodiments, the adaptive signal levels that are calculated based on the synchronization pattern are only used if they differ from the default values by more than a predetermined amount. In some embodiments, the predetermined amount may be 0. In other embodiments, the predetermined amount may be 10%. In other embodiments, the adaptive signal levels that are calculated based on the synchronization pattern are only used if the absolute values of the adaptive signal levels are less than the absolute value of the default values by at least the predetermined amount. In another embodiment, the adaptive signal levels that are calculated based on the synchronization pattern are only used if the absolute values of the adaptive signal levels are more than the absolute value of the default values by at least the predetermined amount.

If it is determined that the adaptive signal levels that are calculated based on the synchronization pattern are to be used, these new values are applied to the Viterbi Equalizer 66, as shown in Box 240. If it is determined that the adaptive signal levels that are calculated based on the synchronization pattern are not to be used, the Viterbi Equalizer uses the default signal levels, as shown in Box 250.

This sequence can be repeated for each incoming packet.

There are variations of this system that may be implemented. For example, in one embodiment, not all of the data samples in the synchronization pattern are used to determine the adaptive signal levels.

In another embodiment, in addition to using some or all of the synchronization pattern, all or a portion of the preamble may also be used to determine the adaptive signal levels. For example, once the preamble has been detected, the values of the data samples in some or all of the preamble may be used in conjunction with the synchronization pattern to obtain the adaptive signal levels. Further, any part of the packet which includes known sequences may also be used to obtain the adaptive signal levels.

In yet another embodiment, the adaptive signal levels may be determined using sequences in the payload of the packet which are not known beforehand. For example, as the data samples are received, the synchronization pattern is found. The network interface 30 may then determine the value of each subsequent bit based on its data sample, such as by slicing all samples above zero to become a bit 1 and all samples below zero to a 0 bit. Once the bits and the associated data samples are known, these values can be averaged as described above to create the adaptive signal levels. In another embodiment, the Viterbi operation can be split into stages, for example, after every 32 output bits from the Viterbi Equalizer, those 32 bits and associated samples can be averaged as described before to create the adaptive signal levels to be used for the next 32 bit block. This way signal levels can be adapted within the packet for cases where the frequency deviation changes within the duration of a packet.

Further, in the above example, it is assumed that the frequency offset has been removed before the adaptive signal levels are calculated. Specifically, as shown in FIG. 6, the frequency offset is calculated before the synchronization pattern is detected. Thus, the values that are used to generate the adaptive signal levels assume that there is no frequency offset. However, it is also possible to determine the adaptive signal levels without performing the frequency offset correction in advance.

If frequency offset is not removed, then it can be shown that the optimal values for the expected signal levels $\xi_a$, $\xi_b$, $\xi_c$ can be determined by minimizing the cost function:

$$C = \sum_{i=0}^{N-1} |y_i - \xi_i - F|^2$$

where C is cost, $y_i$ is an incoming data sample, F is the frequency offset and $\Sigma_i$ is the expected value of that data sample. This equation can be rewritten in matrix notation as:

$$C = (y - Ax)^T(y - Ax), \text{ where } y = \begin{bmatrix} y_0 \\ y_1 \\ y_2 \\ \vdots \\ y_{N-1} \end{bmatrix}$$

$$A = \begin{bmatrix} s_0^a & s_0^b & s_0^c & 1 \\ s_1^a & s_1^b & s_1^c & 1 \\ s_2^a & s_2^b & s_2^c & 1 \\ \vdots & \vdots & \vdots & \vdots \\ s_{N-1}^a & s_{N-1}^b & s_{N-1}^c & 1 \end{bmatrix} \text{ and } x = \begin{bmatrix} \xi_a \\ \xi_b \\ \xi_c \\ F \end{bmatrix}$$

In the A matrix, the coefficients are set to −1,0 or 1, depending on the state of the received bit. In other words, if bit N in the synchronization pattern is a 1 and is surrounded by two adjacent bits of 0, the coefficients in the $N^{th}$ row of the A matrix would be 0,0,1,1. If bit M in the synchronization pattern is a 0 which has exactly one adjacent data bit of 1, the coefficients in the $M^{th}$ row of the A matrix would be 0,−1,0,1.

The gradient of this equation with respect to the unknown vector x, may be used to solve for the unknown vector x. Specifically, the gradient is as follows:

$$\nabla_x C = 2A^T A x - 2A^T y = 0;$$

Solving for this results in:

$x=(A^TA)^{-1}A^Ty=A^\dagger$, where $A^\dagger$ is the pseudo inverse of A and can be precalculated.

Thus, the adaptive signal levels and the frequency offset can be derived from the following equation:

$$\begin{bmatrix} \xi_a \\ \xi_b \\ \xi_c \\ F \end{bmatrix} = \begin{bmatrix} A_{a,0}^\dagger & A_{a,1}^\dagger & \cdots & A_{a,N-1}^\dagger \\ A_{b,0}^\dagger & A_{b,1}^\dagger & \cdots & A_{b,N-1}^\dagger \\ A_{c,0}^\dagger & A_{c,1}^\dagger & \cdots & A_{c,N-1}^\dagger \\ A_{F,0}^\dagger & A_{F,1}^\dagger & \cdots & A_{F,N-1}^\dagger \end{bmatrix} \begin{bmatrix} y_0 \\ y_1 \\ y_2 \\ \vdots \\ y_{N-1} \end{bmatrix}$$

Though more complicated than the embodiment described above, it is possible to determine the adaptive signal levels by calculating the corresponding inner product. Assuming a 32 bit synchronization pattern, each inner product requires 32 multiplications and 31 additions (assuming that the pseudo inverse is predetermined). Furthermore, the frequency offset can also be determined by calculating an inner product.

The present system has many advantages. In one test, packets were transmitted using Wi-SUN (Wireless Smart Ubiquitous Network defined by IEEE 802.15.4). The bit rate was 300 kbps and the packets used FSK modulation. The Wi-SUN specification allows 30% frequency deviation and also allows a wide range of values for BT. In this test, the clock frequency used by the transmitter of the Wi-SUN packets was varied by −30% to +30% from the nominal frequency. It was found that, at certain frequency deviations, the adaptive signal levels provided more than 4 dB of sensitivity gain.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wireless network device, comprising:
   a processing unit; and
   a receive circuit, wherein the receive circuit comprises:
   an RF circuit to generate incoming data;
   a frequency offset circuit to remove a frequency offset from the incoming data to create received data samples;
   a synchronization pattern detector to detect a synchronization pattern from a plurality of received data samples; and
   a Viterbi equalizer, wherein branch metrics between states of the Viterbi equalizer are calculated based on a difference between each received data sample and an expected signal level;
   wherein at least a portion of the synchronization pattern is used to determine adaptive signal levels; and
   wherein the processing unit determines whether the adaptive signal levels or default signal levels are used to compute the branch metrics in the Viterbi equalizer.

2. The wireless network device of claim 1, wherein the adaptive signal levels are always used.

3. The wireless network device of claim 1, wherein the adaptive signal levels are used when absolute values of the adaptive signal levels are less than absolute values of the default signal levels.

4. The wireless network device of claim 1, wherein the default signal levels are used by the synchronization pattern detector.

5. The wireless network device of claim 1, wherein the received data sample is a differentiated phase value, and wherein branch metrics between states are calculated based on a difference between the differentiated phase value and the expected signal level, wherein the expected signal level is determined based on the differentiated phase value of an incoming data bit and differentiated phase values of incoming data bits immediately adjacent to the incoming data bit.

6. The wireless network device of claim 5, wherein six expected values are used in calculating the branch metrics.

7. The wireless network device of claim 6, wherein a first expected value is used when the incoming data bit is a one and the incoming data bits immediately adjacent to the incoming data bit are also one;
and wherein a second expected value, having an equal amplitude and opposite polarity of the first expected value is used when the incoming data bit is a zero and the incoming data bits immediately adjacent to the incoming data bit are also zero.

8. The wireless network device of claim 7, wherein a first adaptive signal level and a second adaptive signal level are calculated using bits within the synchronization pattern having a value of one wherein adjacent bits are also one, and using bits within the synchronization pattern having a value of zero wherein the adjacent bits are also zero.

9. The wireless network device of claim 6, wherein a third expected value is used when the incoming data bit is a one and the incoming data bits immediately adjacent to the incoming data bit are zero;
and wherein a fourth expected value, having an equal amplitude and opposite polarity of the third expected value is used when the incoming data bit is a zero and the incoming data bits immediately adjacent to the incoming data bit are one.

10. The wireless network device of claim 9, wherein a third adaptive signal level and a fourth adaptive signal level are calculated using bits within the synchronization pattern having a value of one wherein adjacent bits are both zero, and using bits within the synchronization pattern having a value of zero wherein the adjacent bits are both one.

11. The wireless network device of claim 6, wherein a fifth expected value is used when the incoming data bit is a one and exactly one of the incoming data bits immediately adjacent to the incoming data bit is one;
and wherein a sixth expected value, having an equal amplitude and opposite polarity of the fifth expected value is used when the incoming data bit is a zero and exactly one of the incoming data bits immediately adjacent to the incoming data bit is zero.

12. The wireless network device of claim 11, wherein a fifth adaptive signal level and a sixth adaptive signal level are calculated using bits within the synchronization pattern having a value of one wherein exactly one adjacent bit is also one, and using bits within the synchronization pattern having a value of zero wherein exactly one adjacent bit is also zero.

13. The wireless network device of claim 1, wherein the receive circuit comprises a preamble detector to detect a preamble pattern wherein at least a portion of the preamble pattern is also used to determine the adaptive signal levels.

14. A wireless network device for receiving a packet, comprising:
a processing unit; and
a receive circuit, wherein the receive circuit comprises:
a Viterbi equalizer, wherein branch metrics between states of the Viterbi equalizer are calculated based on a difference between a received data sample and an expected signal level;
wherein at least a portion of the packet is used to determine adaptive signal levels; and
wherein the processing unit determines whether the adaptive signal levels or default signal levels are used to compute the branch metrics in the Viterbi equalizer.

15. The wireless network device of claim 14, wherein the at least a portion of the packet comprises a synchronization pattern of the packet.

16. The wireless network device of claim 14, wherein the adaptive signal levels are computed using a pseudo inverse matrix multiplied by the received data samples associated with the at least a portion of the packet.

17. The wireless network device of claim 14, wherein the at least a portion of the packet comprises a synchronization pattern of the packet, and wherein a matrix from which the pseudo inverse matrix is calculated is constructed based on a known sequence of data values in the synchronization pattern.

18. The wireless network device of claim 14, wherein frequency offset is computed using a pseudo inverse matrix multiplied by the received data samples associated with the at least a portion of the packet.

19. The wireless network device of claim 18, wherein the frequency offset is subtracted from incoming data samples so as to create the received data samples entering the Viterbi equalizer.

20. The wireless network device of claim 14, wherein the at least a portion of the packet comprises data samples from a payload of the packet.

* * * * *